United States Patent
Fabret et al.

(10) Patent No.: US 7,885,983 B2
(45) Date of Patent: Feb. 8, 2011

(54) APPARATUS AND METHOD FOR PRODUCING A VIRTUAL DATABASE FROM DATA SOURCES EXHIBITING HETEROGENEOUS SCHEMAS

(75) Inventors: Françoise Fabret, Versailles (FR); François Llirbat, Bagnolet (FR); Eric Simon, Juvisy (FR)

(73) Assignee: Business Objects Software Ltd., Dublin (IE)

(*) Notice: Subject to any disclaimer, the term of this patent is extended or adjusted under 35 U.S.C. 154(b) by 258 days.

(21) Appl. No.: 11/480,281

(22) Filed: Jun. 30, 2006

(65) Prior Publication Data
US 2007/0016596 A1    Jan. 18, 2007

(30) Foreign Application Priority Data
Jul. 1, 2005  (FR) .................................. 05 07053

(51) Int. Cl.
G06F 7/00 (2006.01)
G06F 17/30 (2006.01)

(52) U.S. Cl. ...................................... 707/803; 707/809
(58) Field of Classification Search ................ 707/102, 707/803, 809
See application file for complete search history.

(56) References Cited

U.S. PATENT DOCUMENTS

| 5,634,053 | A | | 5/1997 | Noble |
| 5,806,066 | A | * | 9/1998 | Golshani et al. ............ 707/100 |
| 5,937,410 | A | * | 8/1999 | Shen ...................... 707/103 R |
| 5,960,200 | A | * | 9/1999 | Eager et al. ................ 717/147 |
| 6,823,390 | B1 | * | 11/2004 | Bauwens et al. ............ 709/228 |
| 7,032,003 | B1 | * | 4/2006 | Shi et al. .................... 709/203 |
| 2002/0107840 | A1 | * | 8/2002 | Rishe ............................ 707/3 |
| 2003/0208805 | A1 | | 11/2003 | Eby et al. |
| 2004/0015783 | A1 | | 1/2004 | Lennon |
| 2004/0123048 | A1 | | 6/2004 | Mullins et al. |
| 2006/0117057 | A1 | * | 6/2006 | Legault et al. .............. 707/102 |
| 2006/0259442 | A1 | * | 11/2006 | Iqbal .......................... 705/400 |

OTHER PUBLICATIONS

Batini et al, "A Comparative Analysis of Methodologies for Database Schema Integration", Dec. 1986, ACM Computer Surveys, vol. 18, No. 4, pp. 324-364.*

Spaccapietra et al, "Model Independent Assertions for Integration of Heterogeneous Schemas", 1992, VLDB Journal, vol. 1, pp. 81-126.*

(Continued)

*Primary Examiner*—Apu M Mofiz
*Assistant Examiner*—Jared M Bibbee
(74) *Attorney, Agent, or Firm*—Cooley LLP

(57) ABSTRACT

A computer readable medium includes executable instructions to define an individual publication schema for each heterogeneous source of a set of heterogeneous sources. Each individual publication schema specifies mapping rules between data from a heterogeneous source and a non-permanent structured instance of data. A non-permanent structured instance of data as defined by an individual publication schema is generated. An integration schema defining a set of integration rules for combining data from each non-permanent structured instance of data as defined by individual publication schema is established. A target non-permanent structured instance of data to include data from the plurality of heterogeneous sources based on at least one integration schema is formed.

32 Claims, 10 Drawing Sheets

OTHER PUBLICATIONS

Motro, Superviews: Virtual Integration of Multiple Databases, IEEE Transactions on Software Engineering, Los Alamitos, CA, US, vol. 13, No. 7, Jul. 1987, pp. 785-798.

Spaccapietra, View Integration: a Step Forward in Solving Structural Conflicts, IEEE Transactions on Knowledge and Data Engineering, vol. 6, No. 2, Apr. 1994, pp. 258-274.

Ahmed, An Overview of Pegasus, Research Issues in Data Engineering, Third International Workshop on Vienna, Austria, Apr. 19-20, 1993, Los Alamitos, CA, US, IEEE Comput. Soc, US, Apr. 1993, pp. 273-277.

Batini, A Comparative Analysis of Methodologies for Database Schema Integration, ACM Computing Surveys, vol. 18, No. 4, Dec. 1986, pp. 323-364.

Reddy, Towards an Attractive Schema Integration Architecture for Heterogeneous Database Systems, Research Issues in Data Engineering, Third International Workshop on Vienna, Austria, Apr. 19-20, 1993, Los Alamitos, CA, US, IEEE Comput. Soc, US, Apr. 1993, pp. 178-183.

Tan, Meta Objects Approach to Database Schema Integration, Distributed Objects and applications, 2000. International Symposium on Sep. 21-23, 2000, Piscataway, NJ, US, IEEE, Sep. 2000, pp. 145-154.

Chung, Dataplex: An Access to Heterogeneous Distributed Databases, Communications of the Association for Computing Machinery, ACM, New York, NY, US, vol. 33, No. 1, Jan. 1990, pp. 70-80.

* cited by examiner

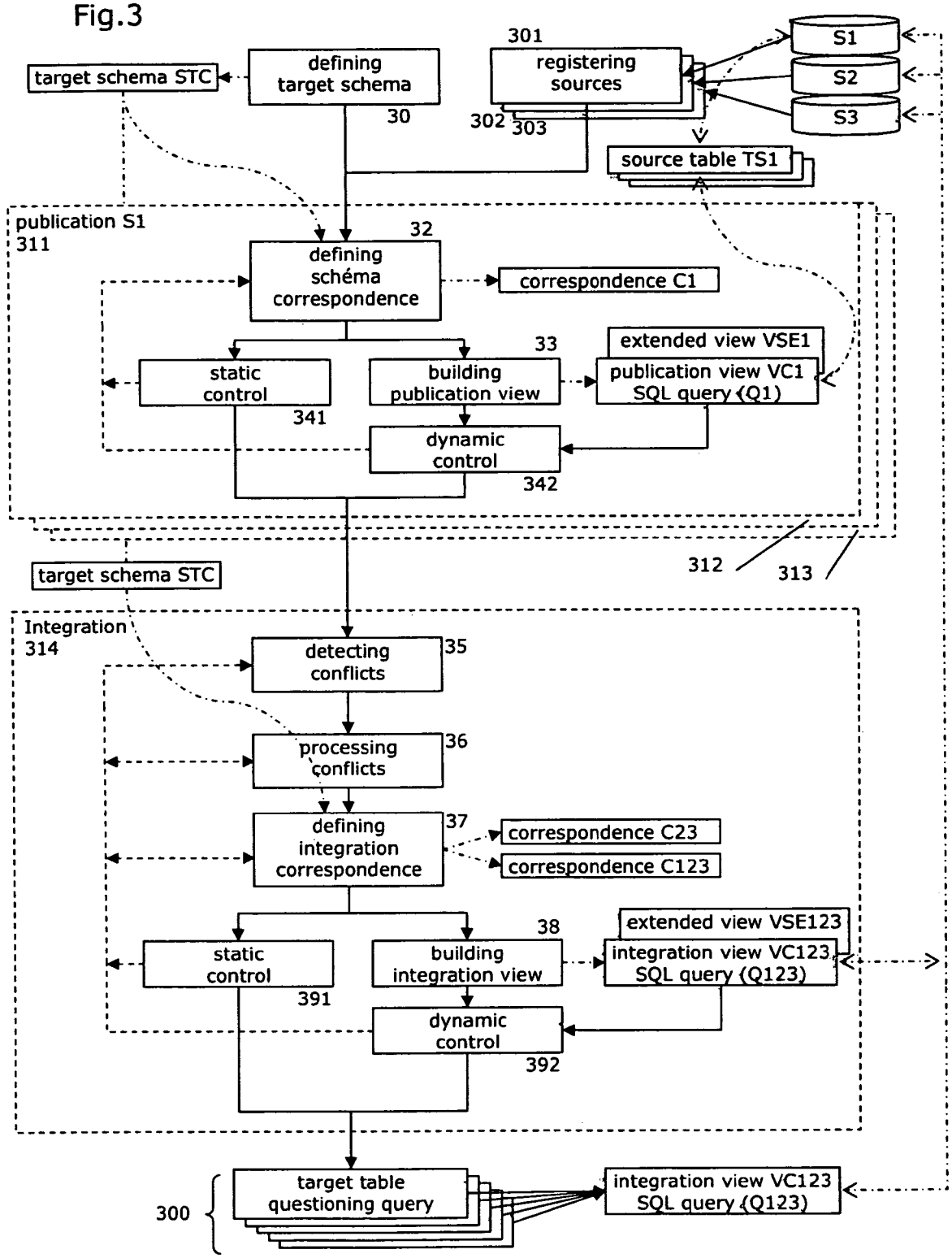

Fig.4

Sales Department : Table « Clients1 »

| IdCli | Name | Street | Postal_zip | Place | Postal_District |
|---|---|---|---|---|---|
| 100 | Martin | null | null | null | null |
| 110 | Dupond | 12, rue des Roses | 15 201 | null | Le Trou |
| 120 | Durand | 1, rue des Peupliers | 12 814 | Bayou | null |

Fig.5

Indirect Sales Department : Table « Clients2 »

| IdCli | Name | Street | Postal_zip | Place | Postal_District | Entering_Date |
|---|---|---|---|---|---|---|
| 1000 | Dupuy | 13, rue des Chênes | 30 000 | null | La Ferté | 01-01-2001 |
| 1010 | Rey | 11, rue des Trèfles | 40 000 | null | La Plaine | 03-05-2003 |
| 1020 | Lapierre | 2, rue des Mimosas | 52 000 | null | Le Val | 08-11-2003 |

Fig.6

Customer Support Department : Table « Clients3 »

| IdCli | Name | Street | Postal_zip | Place | Postal_District | Entering_Date |
|---|---|---|---|---|---|---|
| 1020 | Lapierre | 8, rue des Acacias | 14 110 | null | La Forêt | 04-04-2005 |
| 1010 | Rey | 11, rue des Trèfles | 40 000 | null | La Plaine | 05-01-2004 |

Formula F1 :

1- « IF clients1.postal_district <> null THEN city=clients1.postal_district »
2- « IF clients1.place <> null        THEN city=clients1.place »
3- « other_case ='city unknown' »

Fig. 9

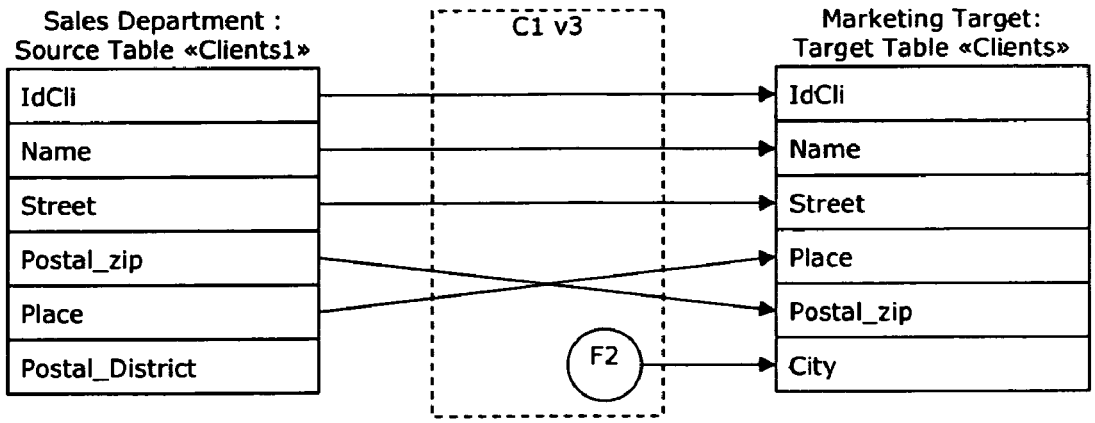

Sales Department: Source Table «Clients1»
- IdCli
- Name
- Street
- Postal_zip
- Place
- Postal_District Marketing Target: Target Table «Clients»
- IdCli
- Name
- Street
- Place
- Postal_zip
- City Formula F2:

1- « IF clients1.postal_district <> null THEN city=clients1.postal_district »
2- « IF clients1.place <> null THEN city=clients1.place »
3- « IF clients1.postal_zip <> null THEN city='city unknown' »

Fig. 10

Marketing Target: Table « Clients »   (through C1)

| IdCli | Name | Street | Place | Postal_zip | City |
|---|---|---|---|---|---|
| 100 | Martin | null | null | null | null |
| 110 | Dupond | 12, rue des Roses | null | 15 201 | Le Trou |
| 120 | Durand | 1, rue des Peupliers | Bayou | 12 814 | null |
| 100 | Martin | null | null | null | ville inconnue |
| 110 | Dupond | 12, rue des Roses | null | 15 201 | Le Trou |
| 120 | Durand | 1, rue des Peupliers | Bayou | 12 814 | Bayou |
| 110 | Dupond | 12, rue des Roses | null | 15 201 | Le Trou |
| 120 | Durand | 1, rue des Peupliers | Bayou | 12 814 | null |

- Rows 1-3: C1 v1
- Rows 4-6: C1 v2
- Rows 7-8: C1 v3

Fig. 11

Erroneous Records: Table « Clients »   (through C1 v1)

| IdCli | Name | Street | Place | Postal_zip | City |
|---|---|---|---|---|---|
| 100 | Martin | null | null | null | null |
| 120 | Durand | 1, rue des Peupliers | Bayou | 12 814 | null |

Query: « SELECT * FROM Clients WHERE Clients.city IS null »

Fig.14
Marketing Target : Table « Clients »          (through C2)
| IdCli | Name | Street | Place | Postal_zip | City |
|---|---|---|---|---|---|
| 1000 | Dupuy | 13, rue des Chênes | null | 30 000 | La Ferté |
| 1010 | Rey | 11, rue des Trèfles | null | 40 000 | La Plaine |
| 1020 | Lapierre | 2, rue des Mimosas | null | 52 000 | Le Val |
Fig.15
Marketing Target : Table « Clients »          (through C3)
| IdCli | Name | Street | Place | Postal_zip | City |
|---|---|---|---|---|---|
| 1020 | Lapierre | 8, rue des Acacias | null | 14 110 | La Forêt |
| 1010 | Rey | 11, rue des Trèfles | null | 40 000 | La Plaine |
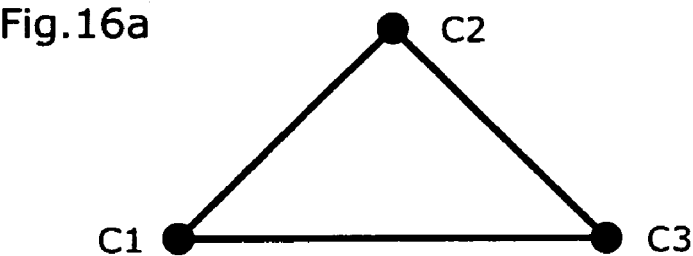
Fig.16a
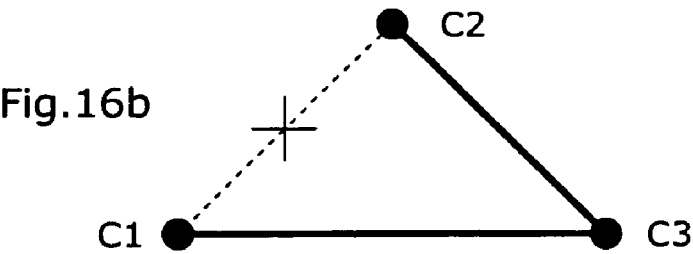
Fig.16b
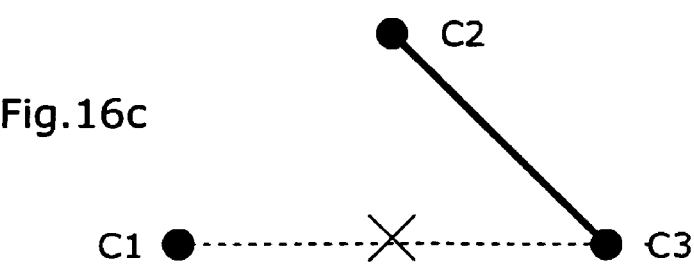
Fig.16c

Fig.17a

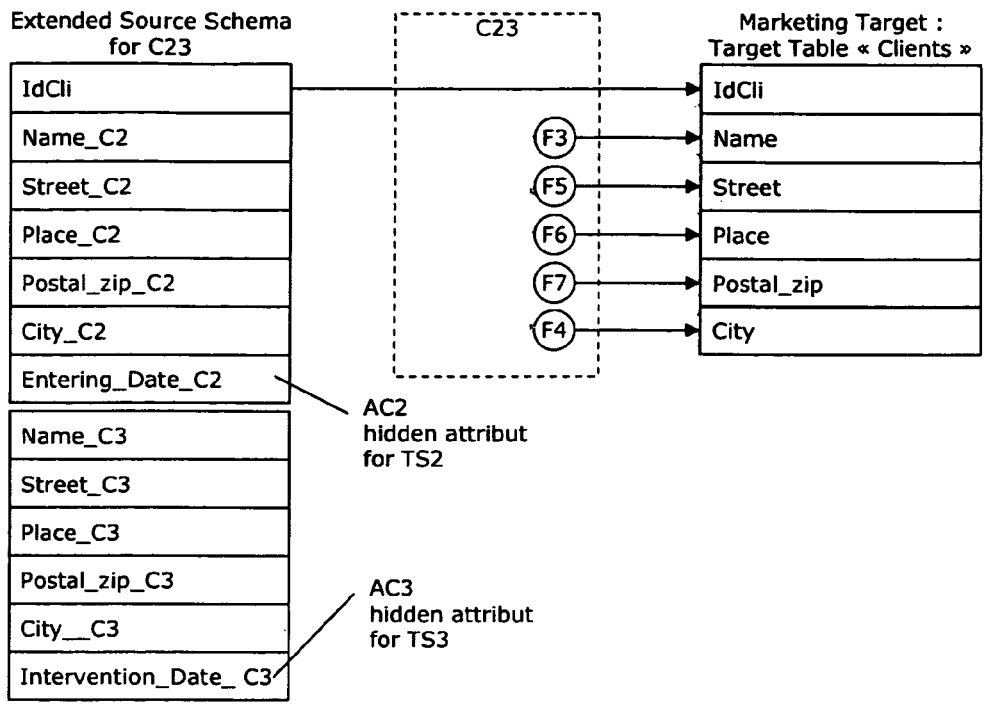

Formula F3 :

« IF name_C2=name_C3    THEN name= name_C2 »
« IF name_C2=null        THEN name= name_C3 »
« IF name_C3=null        THEN name= name_C2 »

Formula F4 :

« IF city_C2=city_C3    THEN city=city_C2 »
« IF city_C2=null       THEN city=city_C3 »
« IF city_C3=null       THEN city=city_C2 »
« IF city_C2<>city_C3 AND intervention_date_C3>entering_date_C2 THEN city=city_C3 »

Formula F5 :

« IF street_C2= street_C3    THEN street=street_C2 »
« IF city_C2<>city_C3 AND intervention_date_C3>entering_date_C2
              THEN street= street_C3 »
« other_case = 'street unknown' »

Fig.17b

Formula F3 :

| « IF name_C2=name_C3 | THEN name=name_C2 » |
|---|---|
| « IF name_C2=null | THEN name=name_C3 » |
| « IF name_C3=null | THEN name=name_C2 » |

Formula F4 :

« IF city_C2=city_C3    THEN city=city_C2 »
« IF city_C2=null             THEN city=city_C3 »
« IF city_C3=null             THEN city=city_C2 »
« IF city_C2<>city_C3 AND intervention_date_C3>entering_date_C2 THEN city=city_C3 »

Formula F5 :

« IF street_C2= street_C3      THEN street=street_C2 »
« IF city_C2<>city_C3 AND intervention_date_C3>entering_date_C2
              THEN street= street_C3 »
« other_case = 'street unknown' »

Formula F7 :

« IF postal_zip_C2=postal_zip_C3 THEN postal_zip=postal_zip.C2 »
« IF postal_zip_C2 IS null AND city_C2=city_C3 THEN postal_zip=postal_zip_C3 »
« IF postal_zip_C3 IS null AND city_C2=city_C3 THEN postal_zip=postal_zip_C2 »
« IF postal_zip_C2 <> postal_zip_C3 AND city_C2<>city_C3 AND
        intervention_date_C3>entering_date_C2 THEN postal_zip=postal_zip_C3 »

Fig.18

Marketing Target : Table « Clients »        (through C123)

| IdCli | Name | Street | Place | Postal_zip | City |
|---|---|---|---|---|---|
| 1000 | Dupuy | 13, rue des Chênes | null | 30 000 | La Ferté |
| 1010 | Rey | 11, rue des Trèfles | null | 40 000 | La Plaine |
| 1020 | Lapierre | 8, rue des Acacias | null | 14 110 | La Forêt |
| 110 | Dupond | 12, rue des Roses | null | 15 201 | Le Trou |
| 120 | Durand | 1, rue des Peupliers | Bayou | 12 814 | null |

}  C23 (rows 1000, 1010, 1020)
}  C1 v3 (rows 110, 120)

APPARATUS AND METHOD FOR PRODUCING A VIRTUAL DATABASE FROM DATA SOURCES EXHIBITING HETEROGENEOUS SCHEMAS

PRIORITY CLAIM

This application claims priority to French Patent Application Number 05 07053, filed Jul. 1, 2005, entitled "Method and System for Producing a Virtual Database from Data Sources Exhibiting Heterogeneous Schemas", which is incorporated herein by reference in it entirety.

BRIEF DESCRIPTION OF THE INVENTION

This invention relates generally to the processing of digital data. More particularly, this invention relates to a technique for producing a virtual database from data sources with heterogeneous schemas.

BACKGROUND OF THE INVENTION

Databases typically use permanent, high capacity storage devices to store large volumes of data. In general, the data is managed by one or more computers using a software application with a database engine, which provides an interface to facilitate database queries. A database query specifies the data that should be retrieved. Structured Query Language (SQL) is commonly used to specify database queries. The data specified by a query is delivered to a program or to a user who issued the query.

It is often useful to access data from different sources without having to aggregate its storage or its management. This may involve, for example, studying a problem by regularly updating an "operational dashboard" within a company or group of companies. This may also involve pooling different company databases, while retaining flexibility by allowing different subsidiaries to manage and update its own data. One way of doing this is to produce a "virtual database". As used herein, the term virtual database refers to a system that facilitates direct access to data from a number of discrete databases. A virtual database comprises one or more target tables, which can be consulted in a similar way to a conventional database. In the same way as in a data table within a non-virtual database, each of these target tables has a schema of its own, i.e., a structure and an organization defining the types of data which it supplies. The records in the target tables are created or instantiated from data originating from the various sources only when requirements dictate, typically at the time of processing a query.

For a target table, instantiation is carried out by means of a query, e.g., an SQL query, the code of which itself comprises the access instructions consulting the different sources involved in order to obtain the necessary data. This query then defines a "view" which supplies the virtual database data and allows access in a similar way to a conventional database. Unfortunately, the SQL code which constitutes the query for this view may demonstrate considerable complexity, resulting in significant work, in particular for analysis, programming and checking. Moreover, if the user wishes to obtain new categories of data by defining new target tables from heterogeneous sources, the schema of the virtual database must be redefined and new queries must be programmed. In addition, the data which populates a database is frequently collected or generated during the activity of an organization. The structure and the organization of this database is in general determined in accordance with the needs or the capacities of the organization. This data is then organised to be easily accessible and usable in accordance with the criteria of the organization. Therefore, various entities often have data in their databases that is not directly compatible or coherent. Such diversity is often the origin of a heterogeneity between different sources of data accessible by a single person or entity, for example between different departments in the same organization or after a merger or a pooling of resources by several organizations. Such sources can be heterogeneous between each other from the point of view of hardware or software and from the point of view of the structure or the organization of the data. This heterogeneity can also include an absence of data in some fields or inconsistencies or contradictions between data listed as representing the same information. In order to have data available that is usable from heterogeneous sources from the hardware or software point of view, compatibility and location tools exist or can be programmed to enable communication between given types of computer or database platforms.

Additional complexity arises from the fact that each source of data often has its own schema, i.e., structure and organization of data. Therefore, it is difficult to prepare standardized interface tools. The combined use of several heterogeneous sources often requires a significant customized development task, depending on the data which the user wishes to obtain.

Therefore, the production of a virtual database, in particular from sources which are heterogeneous from the point of view of their schemas, often represents a significant and delicate task, needing a high degree of skill. In addition, in order to include all the different source schemas, a programmer may have to start with a complete, in-depth study of all these sources, which is also a long and difficult task, and represents a significant cost. For such a study, it is common for example to ask various experts for the sources in question to assemble detailed documentation covering the specifications of the sources which they are familiar with. It is a significant task to study the resultant documentation. Moreover, the subsequent programming for a custom virtual database requires significantly detailed and complex code. The test and validation operations then represent an onerous and complex task, both for the programmer and for the users of the virtual database.

For the same reasons, all subsequent operations to maintain or upgrade this code require caution and an awareness of complex dependencies. It has been proposed that part of this type of task should be automated by means of software tools using a global approach to automatically provide a relationship between the source data and a target schema. After identifying possible relationships a complete list of possible relationships is prepared. By systematic tests covering a certain number of examples, and given the results obtained by these different relationships, the user must then intuitively determine the relationships which the virtual database will produce. Unfortunately, such a technique can provide a very large number of options. Moreover, the fact of choosing from tests on sample data poses the risk that the choices made will not be sufficiently valid in a general way for all the source data, current or future.

It is also known to automatically execute a semantic analysis of the internal structure of a source schema from its XML model. The results of this analysis are then used to define an association between the source schema and the target schema. However, this technique requires possession of an XML model of the schemas and is not directly usable with a source in the form of a relational data table. In addition, it does not take into consideration any association between groups of different or heterogeneous sources.

Finally, such methods do not significantly resolve the difficult problems, which are the extent of the knowledge to be collected in order to produce such a virtual database or the volume and complexity of the code obtained.

In view of the foregoing, it would be desirable to provide an improved technique for producing virtual databases from heterogeneous data sources.

SUMMARY OF THE INVENTION

The invention includes a computer readable medium with executable instructions to define an individual publication schema for each heterogeneous source of a set of heterogeneous sources. Each individual publication schema specifies mapping rules between data from a heterogeneous source and a non-permanent structured instance of data. A non-permanent structured instance of data as defined by an individual publication schema is generated. An integration schema defining a set of integration rules for combining data from each non-permanent structured instance of data as defined by individual publication schema is established. A target non-permanent structured instance of data to include data from the plurality of heterogeneous sources based on at least one integration schema is formed.

The invention facilitates the construction of virtual relational databases from heterogeneous sources. The invention accommodates inconsistencies and contradictions within the heterogeneous sources. The invention provides improved results, while providing enhanced flexibility and simplicity in the production of the virtual database.

BRIEF DESCRIPTION OF THE FIGURES

The invention is more fully appreciated in connection with the following detailed description taken in conjunction with the accompanying drawings, in which:

FIG. 3 illustrates processing operations associated with an embodiment of the invention.

FIGS. 4-6 illustrate records from three source tables.

FIGS. 7-9 illustrate three versions of a first schema defined for a first source table.

FIG. 10 illustrates a target table constructed in accordance with an embodiment of the invention.

FIG. 11 illustrates the results of dynamic control processing associated with an embodiment of the invention.

FIG. 14 illustrates a target table constructed in accordance with an embodiment of the invention.

FIG. 15 illustrates a target table constructed in accordance with an embodiment of the invention.

FIGS. 16A-16C illustrate conflict graphs utilized during integration of three schema in accordance with an embodiment of the invention.

FIGS. 17A-17B illustrates the integration of schemas according to an embodiment of the invention.

FIG. 18 illustrates a record produced in response to the integration of multiple schemas according to an embodiment of the invention.

Like reference numerals refer to corresponding parts throughout the several views of the drawings.

DETAILED DESCRIPTION OF THE INVENTION

Figure 1:
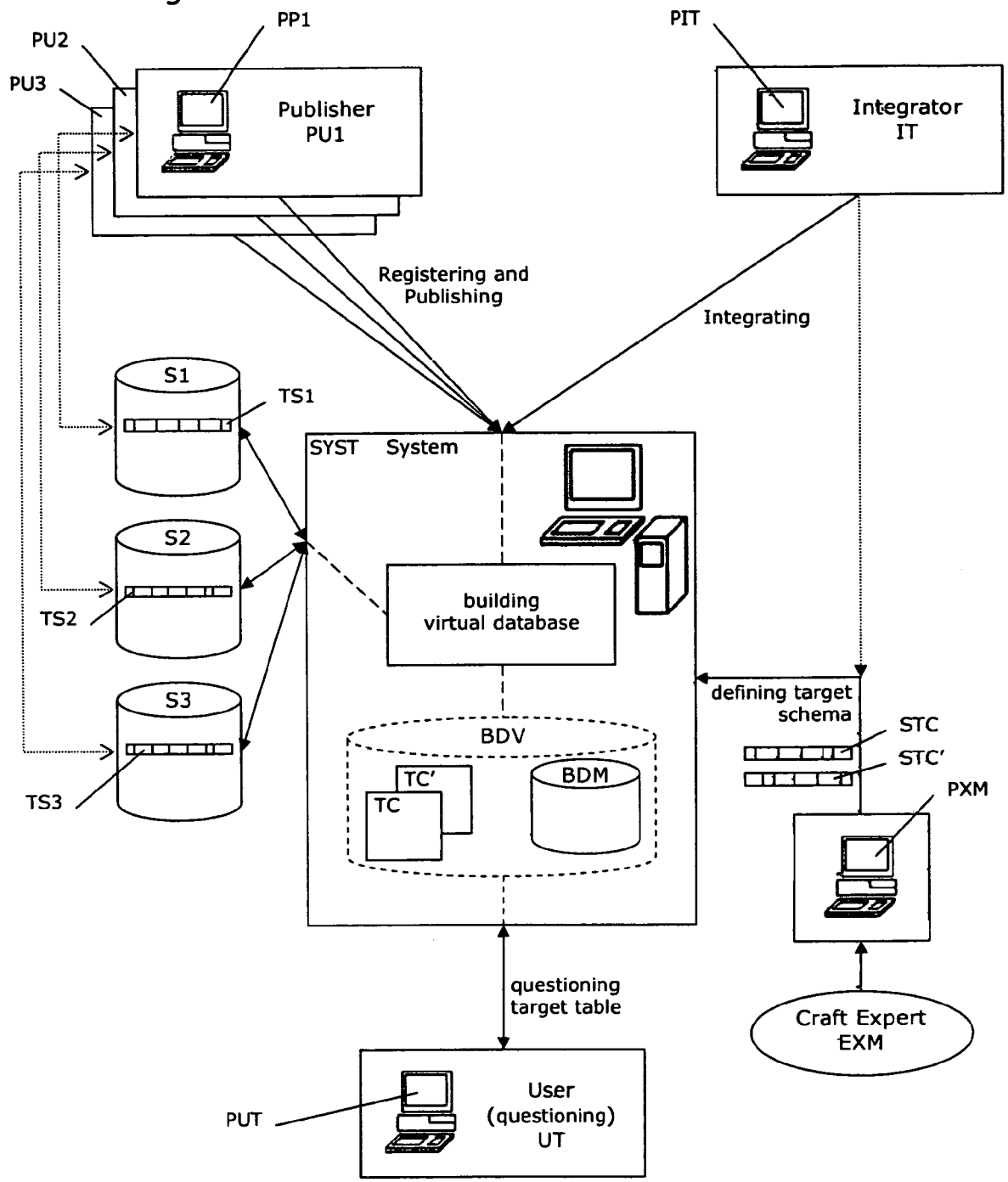
FIG. 1 illustrates a system for producing a virtual database in accordance with an embodiment of the invention.

The invention populates a data table with information from a set of heterogeneous sources. As used herein, the term "data table" may cover different forms of data, organized and accessible in the form of a "relationship" or "relation schema". A "relational" database schema is defined by a set of relationship schemas. A table comprises a variable set of records or "tuples" having an identical structure within the table. This structure comprises the definition of a certain number of attributes, each of a given type, for which each record comprises a stored value. For an attribute, the null value, or "null", corresponds to a value which is otherwise undefined. The data itself may be stored in various hardware or software formats, for example in a database file format such as the ".dbf" or ".mdb" formats, as well as in other types of files such as tree structures, text files, or calculation sheets of the spreadsheet program type. Through various location, exchange or indexing software tools, for example in "ODBC" format (Open DataBase Connectivity), such data can then be accessible and viewed as data tables.

Each data source used to populate a data table can be implemented independently of other data sources and without knowing the functioning or schema of the other data sources. Therefore, the operation of populating the data table may be performed in parallel by different processes or persons. This populating or publication can be implemented by one or more person(s) knowing characteristics of a data source, e.g., the database schema and database content.

The invention facilitates the use of the best existing skills and knowledge for each source used. During publication of the sources, this knowledge is thus assembled and stated in an explicit and uniform form thereby forming a publication schema. The publication schema is then used to establish an integration schema that provides an integration view enabling consultation of the target table.

Once the different sources are published, the integration can then be carried out by a process or person having no need to know the detail or particular features of each of the source data sources. The integration will then require much less time than if it had been necessary to assemble all the specifications from all of the sources concerned. Thus, the integration can be done by a person having less detailed knowledge than the publishers, and this person's task will be simplified and speeded up by having the publication schema verified by knowledgeable publishers. Moreover, the integrator will need to ask only those questions necessary to this phase of the task.

The invention decentralizes and adds flexibility in combining data from disparate sources. Such combining of data can thus be undertaken in a much broader fashion, for example between different disciplines or independent organizations collaborating in accordance with a method which is more co-operative than hierarchical. The invention facilitates mass publication enabling the aggregation of data on a large scale.

The publication schema may be used to facilitate a publication view via a publication query applied to all the source tables used by the publication schema. This may be done automatically from the definitions of the schema. These are converted or compiled automatically by a software program in the form of one or more SQL queries on the published source.

The user definition of target table instances according to source tables thus does not need any computer development, neither in a programming language, nor in a database query language such as SQL. Once a publication schema is defined, the target records that it supplies can be calculated simply by an execution of a publication query. This publication query is stored, for example, in a text file within a meta-database.

Advantageously, the integration processing comprises at least one generation of a view, termed integration view, comprising at least one request applying to all or part of the source tables used by the integration schema. This integration may in particular comprise interactions with a software interface, which stores choices or formulae or rules in the form of a symbolic language termed "integration language". This language is based on the same principles as the schema language and can bring the same type of advantages, in particular only needing little or no computer development.

The generation of the integration view can then be done automatically from the definition of the integration schema. This is translated or compiled automatically by a software program, in the form of an SQL query on the publication views.

Once the integration is carried out, each target table within the virtual database is accessible for consultation simply by an execution of its integration query. This integration query is stored, for example in a text file, within a set of data termed meta-database, which represents the structure of the virtual database.

Optionally, the invention includes the generation of a view, termed symmetric view, comprising a pair of requests applying on the one hand to the source tables of a publication schema and on the other hand to the target table. This symmetrical view may constitute an intermediate step in the generation of the publication view and be stored within the metadata. During the different phases of implementation of the virtual database, all or part of the intermediate data or results may be stored in this meta-database.

Therefore, the different rules or selections defining the schema may be stored along with the queries defining the different publication views. The storage of this intermediate data enables in particular the checking or correction of the intermediate steps or the editing or addition of some of them. In a particular embodiment of the invention, integration schema is changed in an incremental way by incorporating data from the publication schema. In a similar way, the publication schema is modified in an incremental fashion by taking into account at least one new source table. It is therefore possible to produce a virtual database by means of several incremental operations, for example according to the availability of the sources and of their publication schema or to spread the workload generated. It is also possible to upgrade more easily and in a more flexible way such a virtual database by integrating new sources without needing to restart the integration of sources already used.

A first publication and integration operation may thus be qualified as single pass or "one-shot". The publication schema and integration schema may then be incrementally supplemented while integrating new data.

The incremental integration will thus comprise a new phase of detecting and processing conflicts between on the one hand the new schema and on the other hand schema previously integrated. These new phases of detecting and processing conflicts can use the data stored in the metadatabase during integration. It is then possible to take into account the mapping rules previously prepared previously or to select some rules and possibly to edit or refine them.

According to one aspect of the invention, at least one source table comprises at least one attribute used as a key for the source table or a foreign key for another source table. The invention applies in particular to a target table comprising at least one attribute used as a key for the target table or a foreign key for another target table.

Typically, the definition of the target schema includes constraints applied to the attributes of the target table, for example the target table may comprise one or more compulsory attributes. An attribute is termed compulsory if it cannot take the "null" value in order to comply with the constraints of the schema in which it is defined. In particular, any key within a table constitutes a compulsory attribute. Therefore, the target schema may require that certain attributes, possibly other than keys, must be populated for all records which will appear in the target table.

Typically, a publication schema corresponds to one or more source tables and comprises the following elements:
  a source part, comprising the source table(s);
  one or more composition links stated between the source tables, and which define the composite records within the source part, from the records of the source tables;
  a target part, comprising the aimed target table;
  calculation formulae, that may be reduced to a mere equality, supplying a value for each attribute of the target table, directly or from one or more attributes of the source part;
  optionally, one or more source filters, stated on the attributes of the source part;
  optionally, one or more target filters, stated on the attributes of the target part.

It should be noted that a single source, comprising one or more source tables, can be used in order to define the publication schema. This feature may for example enable the division of the task into several sessions or between several publishers. It may also enable the publishing of a single source in several different forms intended to be integrated into several different target tables. According to a particular aspect of the invention, the publication schema uses at least one attribute from the target table, which depends on at least one function or at least one calculation formula, applied to at least one attribute from at least one source table.

According to an embodiment of the invention, the publication schema incorporates attributes. According to different features of the invention capable of being combined together, at least one attribute:
  supplies a constant value, or
  comprises a reference to at least one attribute name from a source table, or
  comprises at least one arithmetic binary operation, or
  uses at least one case processing rule.

According to an aspect of the invention, the publication schema uses at least one composition link stated between at least two source tables. More particularly, at least one composition link between a first and a second source table uses a criterion of equivalence or of equality between the value of at least one attribute of at least one record from the first source table and the value of at least one attribute of at least one record from the second source table.

In one embodiment, a record of the source part, termed composite record, is obtained by composing at least two records, each taken in a different source table, by defining a composition criterion. This criterion is stated as a criterion of equality of values between the attributes taken in the first record and the same number of attributes taken in the second record. This criterion of equality is termed a composition link between the two source tables.

The definition of the composition links between two tables TS1 and TS2 can also be enriched by authorizing criteria of equality of the form "formula(TS1)=formula(TS2) where for any table U, "formula(U)" represents
the reference to an attribute of this table U, or
a functional expression, i.e., a composition of functions, applied to one or more attributes of this table U.
Consider, for example, a source table TS1 with a record (a, b, c) for attributes A1, B and C.

| Source Table TS1 | | |
|---|---|---|
| A1 | B | C |
| a | b | c |

Also consider source table TS2 with a record (a, d, e) for attributes A2, D and E.

| Source Table TS2 | | |
|---|---|---|
| A2 | D | E |
| a | d | e |

A composition link comprising at least one equality between the values of the attributes A1 and A2 may be formed, the composite record obtained will then be (a, b, c, d, e). A publication schema may use one or more filters stated on one or more attributes of one or more source tables. In particular, a filter may comprise a conditional expression, in particular stated on one or more attributes of a source table. The records from the source tables used in the source may be filtered by means of selection criteria. Only records from source tables which pass these filters are capable of producing composite records and therefore of producing records in the target table. A conditional expression may take one of the following forms:
a Boolean binary operation of the form: "(formula OP value)" where "formula" is either the reference to the filtered attribute or a functional expression, i.e. a composition of functions, applied to one or more attribute(s) of the source part and "OP" is a conventional comparison operator, for example: <, >, =, <=, =>, < >, LIKE, NOT LIKE. For example: "id.client>999"
a framing expression of the form: "(value1 OP formula OP value2)", where formula has the same meaning as in the preceding case, while OP is restricted to one of the following comparison operators: <, >, <=, =>. For example: "999<id.client<9999"
a combination of conjunctions and disjunctions of Boolean binary operations or framing expressions. For example: "(LEFT(id.client; 2)=12) AND NOT(999<id.client<9999)", where "LEFT(id.client; 2)" is a function returning the two left hand characters of the code "id.client".

Calculation formulae are used in order to describe the method for constructing a record in the target table from a composite record. Each of these formulae describes how to calculate the value of an attribute of the target table from the values of the attributes of the composite record.

A calculation formula for a target attribute "A" may in particular take one of the following forms:
a constant. If the calculation formula F associated to A is a constant, it can also be interpreted as a constraint on the values of the records from the target table produced by this relationship. This constraint is then of the form: "A=constant".
a reference to an attribute name from a source table.
a functional expression, i.e. a function or a composition of functions.
an arithmetic expression between several expressions, for example of the form "expression OP expression2". Each expression "expression1" or "expression2" may itself be a functional expression, or a constant, or a reference to an attribute name from a source table, or itself be an arithmetic expression.
an aggregate function, i.e. for example one of the functions "sum", "max", "min", "avg" or "count" which are compliant with the SQL standard syntax. Traditionally, in the SQL syntax, aggregate functions are used in conjunction with the "group by" command to group records according to grouping attributes. In the case of the publication schema or integration schema, the "group by" command is implicit. If at least one aggregate function is present, the attributes of the record which are not referenced in any aggregate function are considered as grouping attributes.

If the target schema has attributes (U, V, W, X, Y, Z), a composite record: (a, b, c, d, e) as cited above could supply a target record: (u, v, d, e, 100, null) by using the following calculation formulae:
for the attribute U: "=f(A1, B)"
for the attribute V: "=g(A1, h(B, C))"
for the attribute W: "=D"
for the attribute X: "=E"
for the attribute Y: "=100"
for the attribute Z: "=null"

where "f", "g" and "h" are functional expressions. "Case processing rules" may be used in order to define different calculation formulae according to the data contained in the composite record defined by the source. Case processing may include of a set of rules of the type: if "condition" then "attribute_name"="calculation_formula". In such a rule, "attribute_name" is the name of the target attribute involved in the case processing and "calculation_formula" may be a constant or a reference to an attribute of a source table or a functional expression, i.e. a function or a composition of functions. The "condition" part is a conditional expression that may pertain to one or more of the attributes of the composite record defined by the source part. Such a conditional expression may be a Boolean binary operation of the form: "calculation formula" OP "calculation formula", where "calculation formula" is for example a constant, or a reference to a source attribute, or a functional expression applied to one or more source attributes, and where "OP" is a conventional comparison operator, for example: "<", ">", "=", "<=", "=>", "< >", "LIKE", "NOT LIKE". For example: "clients1.City < > clients2.City". This conditional expression may also be a framing expression of the form: "calculation formula" OP "calculation formula" OP "calculation formula" where "calculation formula" is for example a constant or the simple reference to a source attribute or a functional expression, i.e. a composition of functions applied to source attributes and OP is one of the following comparison operators: "<", ">", "<=", "=>". For example: "purchase_date<repair date<purchase_date+12 months". Such a conditional expression may also be a sequence of Boolean binary operations and/or framing expressions modified or interlinked by a logical connector, for example "AND", "OR" or "NOT". Thus, a case processing rule may be: "If (S1.A1 LIKE 'ii %') AND (S1.A2=S1.A3) AND (S1.A3 LIKE concat(S1.A4, '%'))

then quantity=S1.A6". This rule will then be interpreted as follows: "For a source record output by the source S1, in the case where the value of the attribute "A1" is in a percentage format, and the value of the attribute "A2" is equal to the value of the attribute "A3", and the value of the attribute "A3" is similar to a concatenation of the value of the attribute "A4" with a "%" character, then the value of the "quantity" attribute of the target record obtained will be equal to the value of the attribute "A6" of this source record". A single attribute may use a plurality of case processing rules executed in a given order.

The rules are examined in the order that they are written. The order can influence the result of the calculation formula. If the conditions of two rules are not disjointed, this means that for a single composite record, both rules could be applied. In this case, it is the value calculated by the first rule which will be used. The software interface for defining the case processing rules make it possible to schedule the rules. If, for a given composite record, no rule is applicable, the composite record is not used in order to produce a record in the craft table defined through the target table. In order to avoid this situation, it is possible to define a rule which will be applied by default if none of the other rules is applicable. The syntax of this rule may be: "If other cases then "calculation_formula". In this example, the key word "other cases" indicates that the formula entitled "calculation_formula" will be executed on any record which does not comply with any of the other case processing rules. In case processing, the "other cases" rule is either non-existent or is placed in the last position. In particular, case processing including a number "k" of rules can be modelled by a formula of the form: IFELSE ((cond1, action1), . . . , (condk, actionk)) where "condi" is the condition of the $i^{th}$ rule and "actioni" is the "then" part of this rule. In the case where the last rule is an "other cases" rule, the parameter "condk" takes the value "NULL". According to an aspect of the invention, the publication schema uses at least one filter stated on at least one attribute of the target table. The definition of a relationship may thus be enriched by means of target filters, applying to the target table of this relationship. A target filter on a target table allows one to filter records by applying calculation formulae to the records from the source tables. Thus only records which pass these filters are used in order to produce records in the target table. The target filters may have the same types of form as source filters.

The invention allows for control of the publication schema and integration schema. In particular, this involves checking the correction of their definitions. According to an aspect of the invention, a static control module is used to assess the validity of schema with respect to at least one syntactical rule. According to another aspect of the invention, a dynamic control module assesses the quality of data contained in at least one record.

The static control relates to the validity of the definition with regard to mapping rules. In particular, it comprises a control of the sufficiency of the composition links, i.e. all the source tables used in the source part of the relationship are interlinked for the definition of a target record. The static control module specifies that all the compulsory attributes of the target table have been populated by the calculation formulae. It particular, it controls whether the key attributes of the target table are populated. The publication schema may be incomplete, for example, if source tables do not contain attributes enabling the population of certain compulsory attributes. In this case, the static control module may indicate a non-completeness which could be considered as a non-blocking error. In order to correctly execute the publication query for an incomplete schema, for example, in order to enable dynamic control, one may artificially attribute a value to a compulsory attribute, such as a null value.

The dynamic control module operates on target records. This involves preliminarily checking the quality of the target records, e.g., checking that they are compliant with the integrity constraints defined on the target table. The integrity constraints may be, in particular:

the validity of the format of the values of an attribute;

the accuracy of the values of an attribute in its domain. The accuracy of the values of an attribute "A" is an assertion specified by means of a formula from the predicate logic. The elementary predicates supported are of the form "<A comparator value>", where comparator is of the form "=", ">", "<", "like";

the completeness of an attribute. The fact that an attribute "A" must comply with the completeness property means that none of its instances must have the value "null", i.e. without a defined value.

the integrity constraints between several attributes. For example, if the attribute "sex" has for its value "M" then the value of the attribute "marital status" cannot be either "Mrs" or "Miss";

the uniqueness of an attribute or of a set of attributes. For example, the uniqueness constraint of an attribute "A" in a target table means that this attribute must not take the same value twice in two records from this target table. This may for example involve a key which must not include doubles in the target table.

The dynamic control module provides corrections in order to obtain the desired quality within the target records. The control of data is carried out interactively with the user. The control is iterative, criterion by criterion, attributes group by attributes group. The validation processing is based in particular on three types of operation: test, sample and analysis.

The test operation consists of calculating the incorrect target records.

The sampling operation consists of filtering the incorrect records in order to group them according to certain criteria.

The analysis operation consists of showing the source records which are involved in the incorrect records.

From one or more integrity constraints defined on the target table, the target records which do not comply with this or these constraint(s) are calculated by an algorithm using a certain number of data inputs.

These data inputs may in particular comprise: the correspondence "C" to be checked, a constraint "CQ" chosen as the test criterion and applying to the records from the target table, and a set "A" of one or more attributes involved in this constraint. From these elements, the algorithm produces a filter "F", which selects the target records which do not comply with this constraint, and may comprise a "Rep" option applying to the form in which the selected records will be supplied.

Within a view "V" associated to the correspondence "C" to be checked, the test algorithm calculates the target records which do not comply with the chosen constraint "CQ". Advantageously, this view "V" will be the broadest view associated with the correspondence to be checked, and in particular a complete view in the case of an integration correspondence.

The form of the response depends on the "Rep" parameter. Depending on the "Rep" value, it may for example supply or display all the calculated records, or only the number of these records. In SQL, the test operation calculates the incorrect records by a query in the following form: "SELECT*FROM V WHERE F'". The sampling of the incorrect records, calculated during the test operation, comprises the use of a supplementary filter "F'", chosen so as to group them according to certain criteria. The sampling operation then supplies a calculated set of target records which is a sub-set of the set of records calculated by the test algorithm mentioned above. In SQL, the sampling operation calculates the incorrect records chosen by a query in the following form: "SELECT*FROM V WHERE F AND F'". The operation to analyze the incorrect records calculates the source records involved in the production of incorrect target records, which enables the user to establish the reasons for these errors. The calculation of the source records uses a "view" applied to the source tables to be checked and which is qualified as "extended source view". This extended view applies both:

to the target attributes of the simple view associated with the correspondence "C" to be checked, and to the attributes of the source tables of this correspondence "C", termed hidden attributes.

This extended source view is calculated by a query termed "extended source query" and its records will be called "extended source records". This extended source view is generated in a similar way to a simple view for this correspondence, but including the hidden source attributes of this same correspondence, in addition to its target attributes. Therefore, an extended source record corresponds to each incorrect target record, with the hidden attributes of the extended source record being the direct projection of the source attributes used. Reading the values of these hidden attributes therefore provides knowledge on the value of the source attributes at the origin of the incorrect target record. From a list of incorrect samples, complete or sampled, the one may calculate the projection of the extended source records on a set "B" of projection attributes.

In SQL, for a list of incorrect target records obtained by a filter "F", the analysis operation calculates the extended source records involved by a query, according to the following form: "SELECT B FROM <extended source view of C> WHERE F". The dynamic control provides a flexible and powerful tool which enables an individual validation of each correspondence and of the data which it supplies. For a correspondence or a group of correspondences (relationships), this validation may advantageously be carried out in an iterative way. For a selected constraint, this validation comprises a calculation and a storing of the non-compliant records. An iterative sampling, by progressively refining the sampling filter "F'" enables one to obtain sufficient data. An analysis of the sample obtained from its source records enables one to define corrections or improvements to be made to the correspondence studied. Throughout the publication processing for each source, the data and definitions of each schema are stored in full or in part in the meta-database. This data is then available, for example for publishers, if they wish to control, edit, improve or complement the publication of their source.

Once a certain number of sources are published, and preferably checked, in the form of publication schema to a single target table, it is possible to begin to integrate the data from the publication schema. The data associated with a publication schema is read into the meta-database and used by a software tool provided with an interface interacting with an integration operator. Typically an integration schema applies to several publication schema and comprises the following elements:

a source part, comprising the different publication views of the publication schema to be integrated;

at least one composition link, to which can be added a formula for the composition of key domains which can enable the resolution of certain conflicts;

a target part, comprising the aimed target table;

calculation formulae, that may be reduced to a mere equality, supplying a value for each attribute of the target table, from one or more attributes of the publication views.

Preferably, the integration schema uses at least one composition link stated between at least two publication schemas and using an equality of keys within the target table, in particular such as is supplied by the different publication schemas.

It should be noted that the source or target filters specified above for the publication processing may also be applied to the integration processing, or be considered as part of the integration, in addition to or as a replacement for the filters applied during publication, without departing from the scope of the invention.

Preferably, the integration schema comprises at least one attribute in which at least one attribute from the target table depends on at least one function of at least one attribute supplied by a publication schema. These attribute functions in a similar way to those described earlier for the publication process, and will not be detailed further at this point.

If a target table comprises records originating from several different publication views, conflicts may occur, for example inconsistencies or contradictions, which did not exist in each of these views, or within the source tables to which they apply. According to an aspect of the invention, the integration processing comprises a detection of domain conflicts between publication data applying to at least a single key attribute of the target table. This detection of domain conflicts comprises at least one comparison operation applied to the value domains accessible by a specified key. In one aspect of the invention, a view is used to identify conflicts, which are typically in pair sets. Integration rules are applied to these pair sets. Publication rules may be used if there are no conflicts, in which case integration is not required.

The method for detecting conflicts comprises in particular a search for non-conflict of domains. The proving tools are rules based on syntactical analysis and/or assertions formulated interactively by the integration operator. The search for non-conflict of domains between two publication values "C" and "C'", applying to the same target table comprises in particular a comparison between their respective key domains, for at least one key applying to a common target attribute "A". This search is made in particular according to one or more of the following rules. For a target table the schema of which comprises at least one key, it is considered that different records are not in conflict if their values for this key take different values. Thus, according to a rule for non-conflict of domains, termed a base rule, for records originating from several publication views, if the domain of this key for a first publication view, i.e. the possible key values for the records, is disjointed from the domain of this key for a second publication view, this means that non-conflict between them is a certainty. According to a first rule of non-conflict of domains, if application of target filters "F" and "F'", defined respectively by these same values of the target table, makes disjointed the domains of keys for the attribute "A" (i.e., if the conjunction "F(A) AND F'(A)" cannot be true), then the publication values "C" and "C'" are considered not to be in conflict. According to a second rule of non-conflict of domains, if the attribute "A" is defined in these two values by two constant functions of different values, then the publication values "C" and "C'" are not in conflict. According to a third rule of non-conflict of domains > if the attribute "A" is defined in both values by a single formula constituting an injective function, and
> if this function comprises as argument both a source attribute "B" from "C" and a source attribute "B'" from "C'", and
> if these source attributes "B" and "B'" are arguments from source filters "F" and "F'" respectively, from both these correspondences "C" and "C'", which are incapable of selecting the same value (i.e., the conjunction "F(X) AND F'(X)" cannot be true whatever the value of "X"), then the publication values "C" and "C'" are considered not to be in conflict.

According to an aspect of the invention, the integration process detects conflicts, termed attribute conflicts, between publication data within the publication schema. Attribute conflicts may include a single attribute, termed a common attribute, within the target table. Non-conflicting attributes are searched. The proving tools are rules based on syntactical analysis and/or assertions formulated interactively by the integration operator. The search for non-conflicting attributes between two publication values "C" and "C'" comprises, in particular, a comparison between their respective calculation formulae for a common target attribute "A", in particular a non-key attribute. This search is made according to one or more of the following rules.

According to a first non-conflicting attribute rule, if the formulae for calculating "A" through "C" and "C'" are constant functions supplying the same value, then the attribute "A" is considered as not to be in conflict with other instances of "C" and "C'". According to a second rule, if "C" and "C'" both comprise a target filter applied to the attribute "A" and selecting only those records where "A" has an identical constant value for "C" and "C'", then the attribute "A" is considered not to conflict with these instances of "C" and "C'".

The methods for the detection and/or the resolution of conflicts have a systematic character which makes them valuable for all possible values of table schemas (source or target) considered. The virtual database thus obtained therefore has qualities of integrity and consistency which do not depend on the content of the source tables, as long as their data complies with the constraints of the source schemas used for the integration. This independence relative to the content enables improved reliability and stability for the virtual database, for example compared with methods using the content of the sources in order to prepare a multi-source view.

The processing of a conflict between several publication values comprises a definition of a least one formula for the composition of domains for at least one key common to the values. This formula may comprise a combination of operations of the union or intersection type for the key domains defined in the publication values. These operations are calculated automatically or entered by the integration operator and are prepared so as to constitute new reduced key domains intended to be disjointed, thus complying with the base rule of non-conflicting domains. This key domain composition formula may in particular be prepared in a recursive way with intermediate control or detection of remaining conflicts. In order to resolve conflicts between publication schema used to issue a target table, in particular if no key domain composition formula is sufficient to resolve them, calculation formulae, or edited existing formulae, which supply the attribute correspondence between the publication views and the target table may be used.

Calculation formulae have a role similar to those existing within the publication schema and may also be termed "mapping" rules, in this case integration mapping. The composition of the target records calculated by the different publication views supplies a composite record (of integration). From this composite record, the key attributes of the target record are supplied directly by equality of the key values. Attributes which are non-key and non-conflicting or attributes which originate only from a single publication view are supplied directly by the composite integration record. In order to resolve conflicts applying to other attributes, the invention proposes to enrich the calculation formulae by one or more case processing rules, functioning in a similar way to those described above. Once defined, the integration schema is checked in a similar way to the control of a publication schema. Its dynamic control may also use hidden attributes in an extended source view. In the case of an integration schema, the extended source view can be obtained by associating the extended source views from the schema correspondences in question. These hidden attributes derive directly from the different source attributes which were used to calculate the target records, and are used during the analysis phase in order to identify the source records or source attributes at the root of any incorrect target records.

Once the integration schema is completely defined and controlled, its data and definitions are stored in full or in part in the meta-database. This data is then available, for example in order to control, edit, improve or complement the integration view of the target table obtained.

During the integration process, an integration operator using a computer graphics interface for displaying at least one publication view defines at least one characteristic of an integration schema using the publication schema. The integration process comprises a use of a computer graphics interface by an integration operator for displaying one or more conflicts between several publication schema and defining at least one rule for resolving the conflicts.

A system implementing the invention comprises a workstation used to carry out the integration process from data associated with the publication schema. A set of workstations, termed publisher stations, are equipped to access or manage administration data specific to a part of the virtual database sources.

FIG. 1 illustrates a system for implementing a virtual database BDV, which may be implemented on a server SYST. The virtual database is a non-permanent structured instance of data, which is a format for information that does not exist in a permanent form. The format changes in response to refined definitions and information is regularly flushed through the format. Thus, there are similarities with a database, but it is not permanent and therefore is more aptly described as a non-permanent or virtual entity.

The virtual database BDV is questioned by one or more users UT on one or more computer stations PUT (e.g., clients). The virtual database BDV is implemented on demand and to the specifications of an expert EXM (or craft expert EXM), for example, a Sales or Marketing Manager. It is managed by a computer system SYST capable of having different types of architecture and comprises one or more target tables TC and TC', each defined by a target schema STC and STC'.

The data within the target tables is calculated in response to a number of computer systems communicating with the system SYST. The computer systems include data sources S1, S2 and S3, for example, which are populated and maintained independently by different departments of a company.

In this example, the virtual database BDV is named "Marketing Target" and the table TC is named "Clients". This target table TC is produced from the following sources:

the source S1 is accessed as a source table TS1 named "clients1" and is managed by the "Sales" department;

the source S2 is accessed as a source table TS2 named "clients2" and is managed by the "Indirect Sales" department;

the source S3 is accessed as a source table TS3 named "clients3" and is managed by the "Customer Support" department;

For the production of the virtual database BDV, each source is registered and then published to the system SYST by a publisher operator PU1 to PU3 using a computer stations PP1 to PP3. Typically, each of these operators PU1 to PU3 is a person who works regularly on the source which he publishes and could thus being termed as "content expert". The content created by the individual content experts is integrated into the virtual database BDV, as discussed below. Thus, the invention facilitates a form of peer-to-peer communication which produces the virtual database BDV.

Typically, the target schemas STC and STC' are prepared by a requester or someone placing an order, for example the expert EXM (or craft expert EXM), who does not need any particular knowledge in databases or in computer systems. These target schemas are entered on a computer station PXM, and are stored in the meta-database BDM of the system SYST.

During publication of the sources S1 to S3 to the system SYST, the SYST stores the characteristics of these publications (i.e., the publication schema) in a meta-database BDM. In order to implement the integration, the metadata BDM is then used by an integrator operator IT working on a computer station PIT. For example, the integrator operator may be a specialized service provider retained for the occasion.

Figure 2:
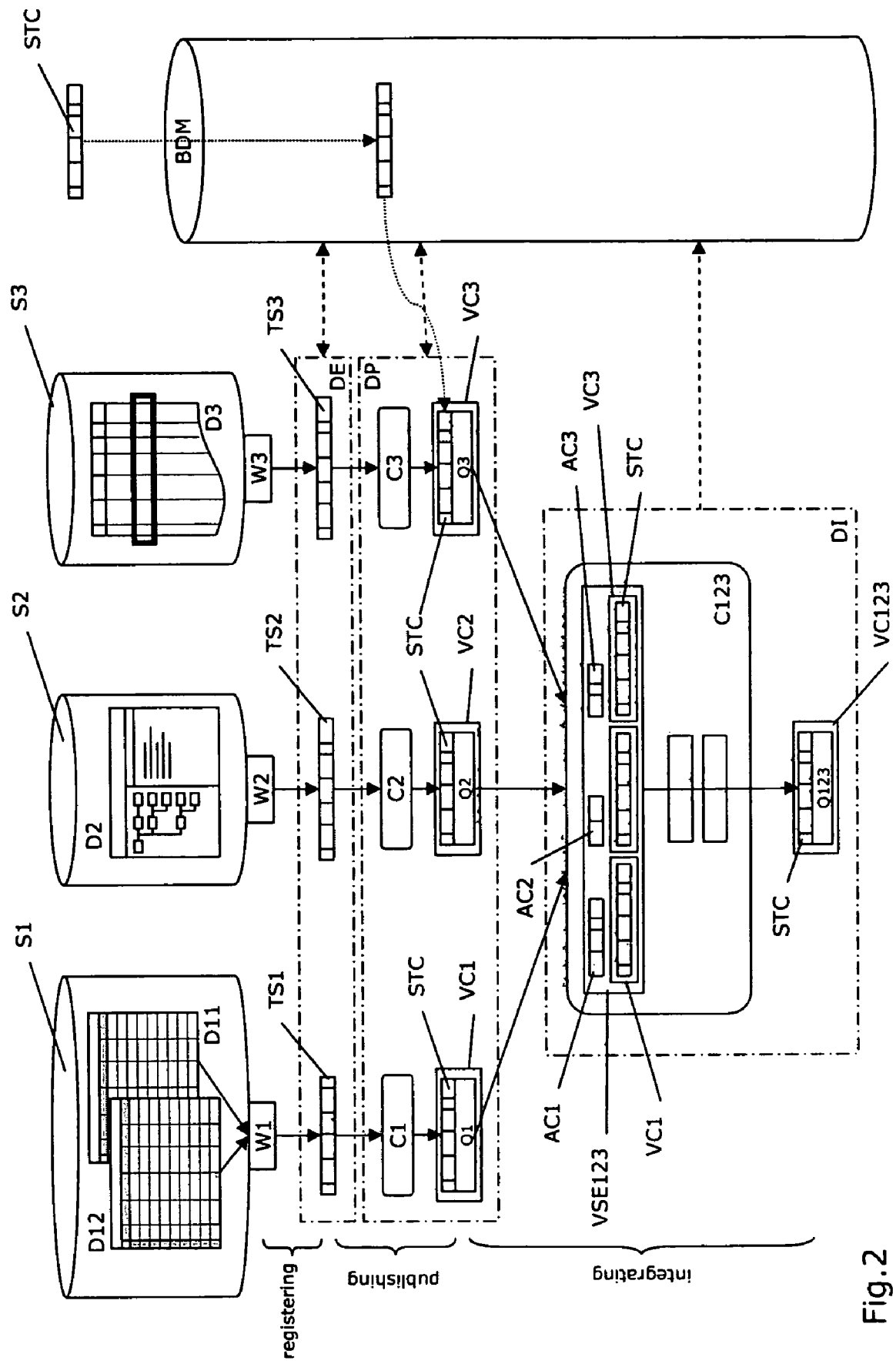
FIG. 2 illustrates a virtual database schema utilized in accordance with an embodiment of the invention.

The process of obtaining a target table TC from the schema STC is more fully disclosed in connection with FIG. 2. The published sources S1 to S3 may contain data in different forms, for example, a plurality of spreadsheets D11 and D12 for the source S1, or a structure D2 of files in a tree arrangement for the source S2, or a set of files in a format implementing a database management system D3. Thus, the data sources are heterogeneous in nature.

Each of these sources is preliminarily "registered" with the system SYST, for example, by the relevant publisher operator or by an administrator familiar with the structure of the data and with the communication system. For each of these sources S1 to S3, this registering uses a software tool W1 to W3 termed a connector or "wrapper", which composes and organizes the data D11 to D3 from the sources S1 to S3 so that it is accessible in the form of source tables TS1 to TS3. A single source may be seen as one or more source tables, according to the way in which it is registered. This registering data DE is stored in the meta-database BDM, where it will be accessible later, for example for publication.

During the publication process for each source S1 to S3, the relevant publisher PU1 to PU3 reads the target schema STC in the meta-database BDM and uses it in order to define one or more publication schemas C1 to C3. The publication schema generate a publication view VC1 to VC3, populating a part of the target schema STC. The publication view is a non-permanent structured instance of data. This view is stated in the form of a query Q1 to Q3 in SQL.

The set DP of data defined and calculated during publication is stored in the meta-database BDM. The publication process uses a publication schema to specify data quality rules to check the quality of data received from a data source.

The publication schema may be viewed as a single schema which incorporates each individual schema assigned to a data source. In other words, each data source may be viewed as having an individual publication schema, which forms a portion of a larger publication schema.

During the integration process, the integrator operator IT reads the publication data DP which interests him in the meta-database BDM, and uses it in order to integrate the different schema correspondences C1 to C3, and to define the integration schema C123. The integration schema specifies a set of integration rules for combining data from each heterogeneous source. The integration schema includes rules that are a superset of the rules associated with the publication schema.

This integration schema comprises in particular the generation of an extended source view VSE123, comprising the different publication views VC1 to VC3 based on the target schema STC. This extended source view may also comprise hidden attributes AC1 to AC3 representing source attributes of the different sources S1 to S3 in question. These hidden attributes correspond to source attributes not required in the target schema STC, but are used in order to calculate the attributes of the target schema, and are used in order to analyze the origins of potential conflicts between the different publication schemas C1 to C3.

On completion of the integration process, the integration schema C123 generates a complete view, termed integration view VC123, applying to the source tables TS1 to TS3 and populating all the compulsory attributes of the target schema STC. The integration view is a non-permanent structured instance of data. This integration view VC123 is stated in the form of a query Q123 in SQL. The set DI of data defined and calculated during integration is stored in the meta-database BDM.

FIG. 3 illustrates processing operations associated with an embodiment of the invention. Once the target schema STC is defined 30, the different source tables TS1 to TS3 which it uses are registered 301 to 303. In this example, the three sources used are then published as three publication schemas 311 to 313, capable of being carried out in similar ways and independently of each other.

The publication schema 311 associated with source S1, seen as a source table TS1, defines one or more schema, in this example a single schema C1. This schema C1 is then applied to a static control module 341. This static control module 341 may be followed by a recursive reiteration of the definition operation 32, for example in order to correct errors detected by the static control module 341.

From this schema C1, optionally after processing by the static control module 341, a publication view VC1 and an extended source view VSE1 are generated by a query (e.g., an SQL query) Q1 applied to the source table TS1. The publication view VC1 and extended view VSE1 are then processed by a dynamic control module 342. The dynamic control module 342 may be invoked by a recursive reiteration of the definition module 32, for example in order to correct errors detected by the dynamic control module 342 or to improve the quality of the target records produced.

Once defined, tuned and checked, the publication schema C1 to C3 are integrated via the integration schema 314. This integration schema includes rules that can be recursive by parts or in all steps, of:

detection of conflicts with a conflict module 35, systematic processing of conflicts with a systematic conflict module 36, definition of integration schema with an integrating schema module 37 (e.g., C123).

In the example presented, the recursive operations of detection, processing and defining result in conflict with the C2 and C3 schema. The integrating schema module 37 thus produces the intermediate definition of an integration schema C23, applied to the schema values C2 and C3 which are still in conflict. The definition operation associated with the integrating schema module 37 comprises the definition of rules or formulae defining the calculation of the target records in a systematic way according to the content of the source records, for example, by case processing rules. Once the conflicting schema C2 and C3 are integrated into an integration schema capable of systematically processing all the source record cases, a full integration schema C123 results. The successive definition of the intermediate integration schema C23, then the full integration schema C123, may be considered a first integration between C2 and C3, followed by an incremental integration of C23 with C1.

Once defined, this full schema C123 is then processed by the static control module 391. The static control module 391 may be followed by a recursive reiteration of the definition operation 32, for example in order to correct errors detected using the static control module 391.

From this integration schema C123, optionally after processing by the static control module 391, an integration view VC123 and an extended source view VSE123 are generated stated in SQL language by a query Q123 applied to the source tables TS1, TS2 and TS3.

The publication VC123 and extended VSE123 views are then used within a dynamic control operation implemented with a dynamic control module 392. The dynamic control operation may be followed by a recursive reiteration of the definition operation associated with the integrating schema module 37, for example in order to correct errors detected by the static control module 392 or to improve the quality of the target records produced.

By successive definitions and controls, it is therefore possible to refine and optimize the integration schema C123, as well as the integration view VC123, which is associated with it. The integration view VC123 and the integration query Q123 which states it can then be used in order to process on demand queries 300 on the calculated target table TC.

The following example is described for the target table TC named "Clients" in which the target schema STC is defined as follows: (Idcli, Name, Street, Place, Postal_Zip, City).

FIG. 4 illustrates a source table TS1 named "Clients1", output by the source S1, originating from the "Sales" department. This source table includes a key attribute "IdCli" and contains three key records populated with the values "100", "110" and "120".

FIG. 5 illustrates the source table TS2 named "Clients2" output by the source S2, originating from the "Indirect Sales" department. This source table includes a key attribute "IdCli" and contains three key records populated with the values "1000", "1010" and "1020".

FIG. 6 illustrates the source table TS3 named "Clients3" output by the source S3, originating from the "Customer Support" department. This source table includes a key attribute "IdCli" and contains two key records populated with the values "1010" and "1020".

Figure 7:
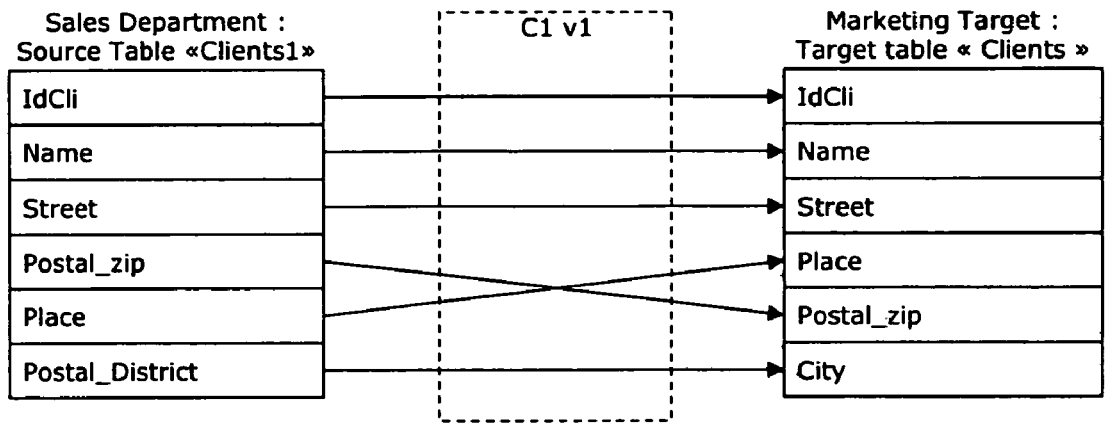

During publication 311 of the source S1 by a publisher PU1, a first iteration of the definition operation 32 leads to a first version of the schema C1, named C1v1, represented in FIG. 7. The calculation formulae are merely references to source attributes.

Figure 8:
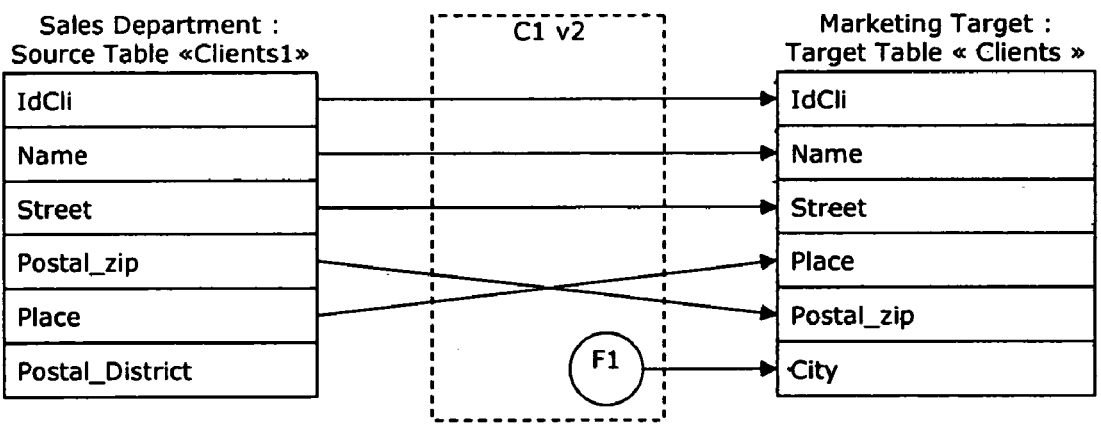

FIG. 8 illustrates a second version of the schema C1 defined during a second iteration of the definition operation 32. This second version includes a case processing formula "F1" allowing the processing of incomplete source records in order to supply a value for the target attribute "City". This is an example of the publication schema utilizing rules to check and refine data quality for eventual loading into the integration schema.

This formula F1 of the publication schema comprises, in the order indicated, the following three rules:

| | |
|---|---|
| 1- "IF clients1.postal_district < > null | THEN City= clients1.postal_district" |
| 2- "IF clients1.place < > null | THEN City=clients1.place" |
| 3- "other_cases ="city unknown" | |

This formula "F1" is assigned to the calculation of the target attribute. "City". It evaluates the rules set out in their order of writing until the condition set out is TRUE.

This formula is interpreted as follows: if the attribute "postal_district" from the source table "clients1" is populated, then its value is used in order to populate the target attribute "city". If this is not the case, the following rule is applied and is interpreted as follows: If the attribute "place" from the source table "clients1" is populated, then its value is used in order to populate the target attribute "city". If this is not the case, the following rule is applied and is interpreted as follows: In all other cases, a target record is produced and the value of its attribute "city" is the string of characters "city unknown".

In other words, all the source records will supply a target record, in which the value indicated for the city will be the postal district if it is populated, if not, the place if it is populated, if not, the comment "City unknown".

FIG. 9 represents a third version of the schema C1 defined for example during a second iteration of the definition operation 32. This third version includes a case processing formula "F2" enabling the processing of incomplete source records in order to supply a value for the target attribute "City". This formula "F2" is different from the formula "F1" of the second version, and has been prepared in order that all the target records produced indicate a name for the city. This modification may have been decided during a dynamic control operation 342 seeking to refine the quality of the data produced for the "clients" target table TC.

This formula F2 comprises, in the order indicated, the following three rules:

1- "IF clients1.postal_district < > null THEN city= clients1.postal_district"
2- "IF clients1.place < > null THEN city=clients1.place"
3- "IF clients1.postal_zip < > null THEN city ="city unknown"

Only the third rule is different from the formula "F1" and set the value to "city unknown" only in the case where the attribute "postal_zip" of the source record is populated. No target record is produced if any one of these rules is not satisfied.

During the definition of the third version of the schema C1, this formula "F2" was prepared in order that all the target records produced indicate a name for the city or supply a postcode, thus allowing a city name to be retrieved. This modification may for example have been decided during a dynamic control operation of the dynamic control module 342 seeking to refine the quality of the data produced for the "clients" target table TC.

FIG. 10 illustrates the target records produced by the schema C1 in three groups output by versions 1, 2 and 3, respectively. One sees that version 1 supplies three target records, including one with an attribute "city" which is unpopulated (value "null"). For this same record, version 2 allows this attribute "city" to be named "city unknown", for example for legibility of the data or for compatibility with a software application receiving this data. Version 3 does not produce this record, as its original source record also does not include a value for the "postal_zip" field. Therefore, only customers capable of being situated geographically are listed by the target table produced.

FIG. 11 illustrates the result of a test operation during the dynamic control operation 342 of the schema C1 version 1. This test is defined so as to list all the target records for which the attribute "city" is unpopulated (value "null") and uses the following SQL query:

---
"SELECT * FROM Clients WHERE Clients.city is Null"
---

This list of incorrect records from the point of view of the city shows that some, however, include a value for the attribute "postal_zip", which allows a geographic location of the customer in question. The fact that this list is available for study enables one to define the formula "F2" in version 3 of the schema C1, which takes into account the presence of a value for the postcode.

Figure 12:
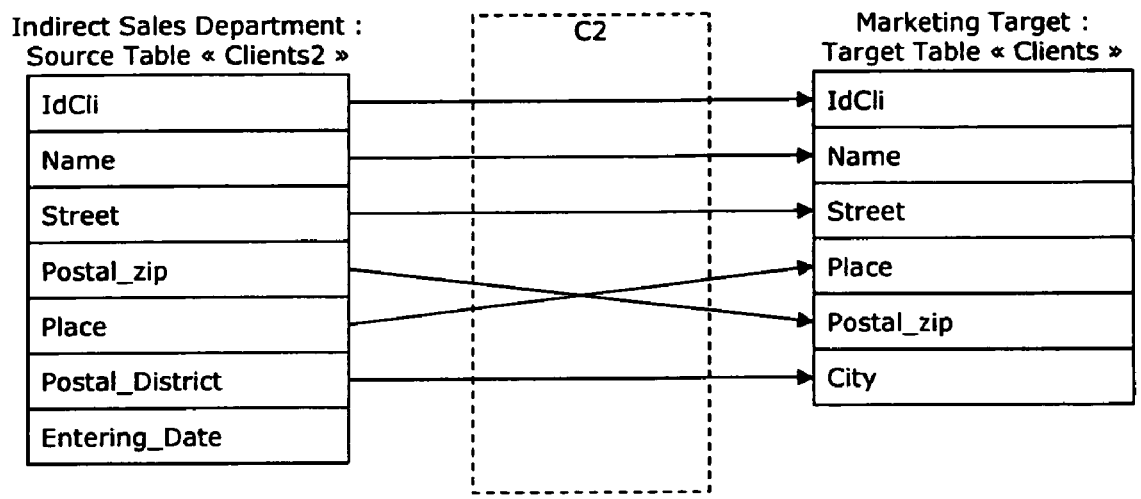
FIG. 12 illustrates a second schema corresponding to a second source table.
Figure 13:
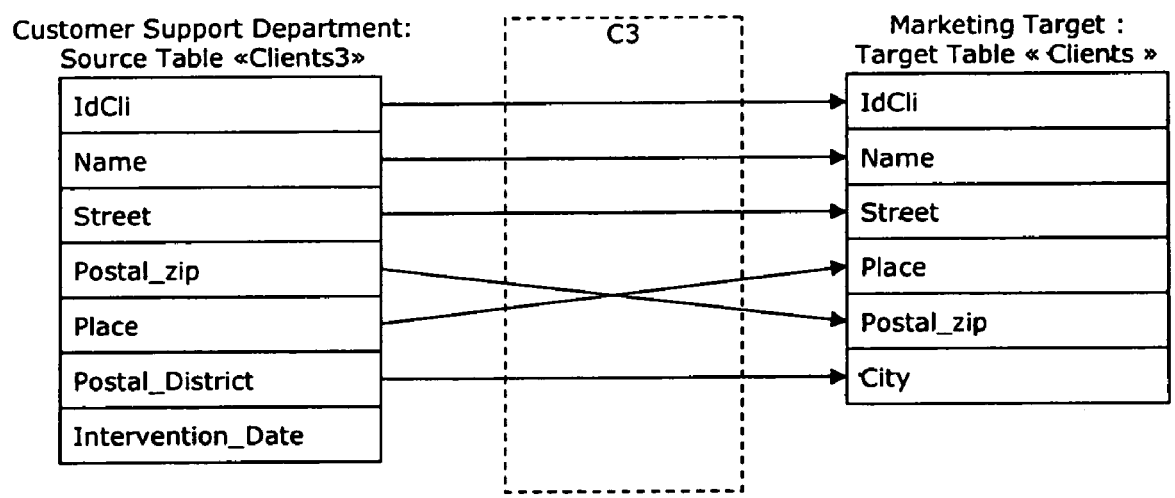
FIG. 13 illustrates a third schema corresponding to a third source table.

FIGS. 12 and 13 represent a schema C2 and C3 defined during the publication operation 312 of the source S2 and of the source S3, respectively. The calculation formulae are merely references to source attributes.

FIGS. 14 and 15 represent the target records produced by the schema C2 and C3, respectively. During the integration process 314 of the schema C1, C2 and C3, an iteration of the detection of conflicts operation associated with conflict module 35 identifies a possibility of conflict between the three schemas C1, C2 and C3. Thus, in this embodiment, the conflict module 35 operates to detect and resolve conflicts in the publication schema. More particularly, the conflict module 35 associated with the integration schema relies upon rules to detect and resolve conflicts associated with different publication schemas associated with different data sources.

FIG. 16A represents these conflicts by lines or arcs connecting three points which represent the schemas C1, C2 and C3. During a subsequent iteration associated with the conflict processing module 36, the integration operator interactive enters a semantic assertion which will reduce the key domains of the source tables TS1 and TS2, based, for example, on constraints of the schemas TS1 and TS2 or generated by some filling conditions of the source tables. This semantic assertion may indicate that:
 all the keys of TS1 are less than the value "1000", and that:
 all the keys of TS2 are greater than or equal to the value "1000".

The key domains of the correspondences C1 and C2 are now therefore disjointed and this establishes that they are no longer in conflict, as illustrated in FIG. 16b.

During a subsequent iteration associated with the conflict processing module 36, the integration operator interactively enters a new semantic assertion which will reduce the key domains of the source table TS3, by indicating that all keys of this source table have a value greater than or equal to "1000". The key domains of the schemas C1 and C3 are now mutually disjointed, establishing that they are no longer mutually conflicting. As illustrated in FIG. 16c, only the schemas C2 and C3 are still conflicting.

The conflicting schema are subjected to an intermediate integration as termed above, supplying an integration schema C23 represented in FIG. 17. The left part of the figure represents a composite record produced by records from C2 and C3 connected by equality of the Idcli keys in the two source tables TS2 and TS3. This composite record is used as a base view in order to prepare the schema C23 and can be used as an extended source view of the integration schema C23.

In the target table produced by this schema C23, the key attribute is produced by direct reference to the key attribute "Idcli" from the source tables TS2 and TS3. The other target attributes are calculated by different formulae.

The "Name" attribute is calculated by the formula "F3", including the following rules:

---
| | |
|---|---|
| "IF name__C2=name__C3 | THEN name=name__C2" |
| "IF name__C2=null | THEN name=name__C3" |
| "IF name__C3=null | THEN name=name__C2" |
---

Therefore, if the names supplied by C2 and C3 are identical, their values populate the target record. If one of the source names is unpopulated, starting with C2, the value of the other name supplied is used. In all other cases, in particular if the two names differ or if no name is supplied, no target record is supplied.

The "Cities" attribute is supplied by the formula "F4" from the following rules:

---
"IF city__C2=city__C3 THEN city=city__C2"
"IF city__C2=null   THEN city=city__C3"
"IF city__C3=null   THEN city=city__C2"
"IF city__C2< >city__C3 AND
   intervention__date__C3>entering__date__C2 then city=city__C3"
---

The attribute "city" is therefore calculated in a similar way to the attribute "name", while adding the case where the two cities are different and the intervention date by the "Customer Support" department (C3 on table TS3) is after the input date supplied by the "Indirect Sales" department (C2 on table TS2). In this case, the fourth rule of the formula "F4" considers that the address may have changed and that it should consider the last of the two, i.e. the intervention address output by C3.

The "Street" attribute is supplied by the formula "F5", including the following rules:

---
"IF street__C2= street__C3    THEN street=street__C2"
"IF city__C2< >city__C3 AND
   intervention__date__C3>entering__date__C2 THEN street=street__C3"
"other__cases= "street unknown""
---

The target attribute "place" is supplied by the formula "F6" according to the same principles from the attributes of the extended source view VSE23 supplied by the schemas C2 and C3.

The target attribute "postal zip" is supplied by the formula "F7", including the following rules:

"IF postal_zip_C2=postal_zip_C3 THEN postal_zip=postal_zip.C2"
"IF postal_zip_C2 IS null AND city_C2=city_C3 THEN postal_zip=postal_zip_C3"
"IF postal_zip_C3 IS null AND city_C2= city_C3 THEN postal_zip=postal_zip_C2"
"IF postal_zip_C2 < > postal_zip_C3 AND city_C2< >city_C3 AND
  intervention_date_C3>entering_date_C2 THEN postal_zip=postal_zip_C3"
"other_cases postal_zip = "postal_zip unknown"

The target attribute "place" is supplied by the formula "F6" constituted according to the same principles from the attributes of the extended source view VSE23 supplied by the schemas C2 and C3.

The target records produced by the schema C23 are represented in the upper part of FIG. 18. The three clients recorded by the "Indirect Sales" department are listed, but the address of the customer for whom the "IDcli" key has the value "1020" has been updated during the integration, from the action address supplied by the "Customer Support" department.

The records produced by the schema C1 are represented in the lower part of the same figure. As the key attributes of these records are in different domains, no conflict is visible here, which may represent the fact that the "Sales" and "Indirect Sales" departments have different customers or have been entered at least with different codes.

The target table TC produced by the integration schema C123 using the three source tables TS1 to TS3 is therefore simply constituted from the bringing together of the target records supplied by the schema C1 and by the schema C23. FIG. 18 therefore represents the records from this target table TC produced by the integration schema C123, which may itself be considered as an incremental integration of schema C1 added to schema C23.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium, comprising executable instructions to:
    define an individual publication schema for each heterogeneous source of a plurality of heterogeneous sources, wherein each individual publication schema specifies mapping rules between data from a heterogeneous source and a non-permanent structured instance of data;
    generate individual non-permanent structured instances of data as defined by the individual publication schemas, wherein each individual non-permanent structured instance of data is a publication view expressed as a query;
    establish an integration schema defining a set of integration rules for combining data from each non-permanent structured instance of data as defined by the individual publication schemas, wherein the integration schema produces a source view with different publication views based on a target schema, wherein the source view includes hidden attributes representing source attributes omitted in the target schema but used to calculate attributes of the target schema and to analyze conflicts between individual publication schemas;
    form a target non-permanent structured instance of data to include data from the plurality of heterogeneous sources based on at least one integration schema; and
    incrementally modify the non-permanent structured instance of data as defined by a publication schema in response to a new source table.

2. The computer readable medium of claim 1 further comprising executable instructions to form a target non-permanent structured instance of data to include data from the plurality of heterogeneous sources based on at least one integration schema in combination with at least one publication schema.

3. The computer readable medium of claim 1 further comprising executable instructions to define an individual publication schema for a heterogeneous source where the individual publication schema specifies data quality rules to check the quality of data from a heterogeneous source.

4. The computer readable medium of claim 1 further comprising executable instructions to apply a first query to the non-permanent structured instance of data as defined by an individual publication schema and a second query to the target non-permanent structured instance of data to form a symmetric view.

5. The computer readable medium of claim 1 further comprising executable instructions to incrementally modify the integration schema in response to changes in the non-permanent structured instances of data as defined by one or more publication schema.

6. The computer readable medium of claim 1 wherein the publication schema includes at least one composition link between at least two source tables.

7. The computer readable medium of claim 1 wherein the publication schema includes at least one filter applied to at least one attribute of at least one source table.

8. The computer readable medium of claim 1 wherein the publication schema includes at least one filter applied to at least one attribute of the target non-permanent structured instance of data.

9. The computer readable medium of claim 1 further comprising a static control module to apply a syntactical rule to a data structure.

10. The computer readable medium of claim 1 further comprising a dynamic control module to assess the quality of data within the publication schema.

11. The computer readable medium of claim 1 further comprising executable instructions to process an attribute referencing at least one attribute name of a source table.

12. The computer readable medium of claim 1 further comprising executable instructions to process an attribute with an arithmetic binary operation.

13. The computer readable medium of claim 1 further comprising executable instructions to process an attribute with at least one case processing rule.

14. The computer readable medium of claim 1 further comprising executable instructions to process an attribute with a plurality of case processing rules executed in a specified order.

15. The computer readable medium of claim 1 further comprising executable instructions to assess a composition link between first and second source tables using an equivalency function between a value of an attribute of one record from a first source table and a value of an attribute of a record from a second source table.

16. The computer readable medium of claim 1 further comprising executable instructions to establish a filter specifying a conditional expression.

17. The computer readable medium of claim 1 further comprising executable instructions to establish a filter specifying a Boolean operation.

18. The computer readable medium of claim 1 further comprising executable instructions to establish a filter specifying a framing expression.

19. The computer readable medium of claim 1 further comprising executable instructions to establish a filter specifying a combination of Boolean operations and framing expressions.

20. The computer readable medium of claim 1, further comprising executable instructions to apply a function to an attribute within the publication schema to define an attribute within the target non-permanent structured instance of data.

21. The computer readable medium of claim 1, further comprising executable instructions to process an attribute used as a key for a table in a target non-permanent structured instance of data.

22. The computer readable medium of claim 1, further comprising executable instructions to process an attribute used as a foreign key for a second table in a target permanent structured instance of data.

23. The computer readable medium of claim 1, further comprising executable instructions to process an attribute used as a key for a source table.

24. The computer readable medium of claim 1, further comprising executable instructions to process an attribute used as a foreign key for a second source table.

25. The computer readable medium of claim 1, further comprising executable instructions to establish compositional links between two or more non-permanent structured instances of data as defined by a publication schema where the compositional links define keys that match a key within the target non-permanent structured instance of data.

26. The computer readable medium of claim 1 wherein the target non-permanent structured instance of data includes a compulsory attribute.

27. The computer readable medium of claim 1 further comprising executable instructions to detect duplicate or conflicting data within more than one non-permanent structured instances of data as defined by a publication schema when the data is associated with at least a single key attribute of the target non-permanent structured instance of data.

28. The computer readable medium of claim 1 further comprising executable instructions to detect duplicate or conflicting data attributes within more than one non-permanent structured instance of data as defined by a publication schema when the data attribute is associated with a common attribute within the target non-permanent structured instance of data.

29. The computer readable medium of claim 1 wherein the target non-permanent structured instance of data has a relational structure.

30. The computer readable medium of claim 1 wherein the heterogeneous sources are dependent on publishing schema mapping rules to define the relationship between data elements.

31. The computer readable medium of claim 1 further comprising executable instructions to reduce key domains of source tables to reduce conflicts.

32. The computer readable medium of claim 1 further comprising representing conflicts by lines connecting points representing schemas.

* * * * *